United States Patent
Castor et al.

(10) Patent No.: US 10,038,501 B2
(45) Date of Patent: Jul. 31, 2018

(54) METHOD AND APPARATUS FOR REDUCED FLICKER VISIBLE LIGHT COMMUNICATIONS (VLC)

(71) Applicant: InterDigital Patent Holdings, Inc., Wilmington, DE (US)

(72) Inventors: Douglas R. Castor, Norristown, PA (US); Samian Kaur, Plymouth Meeting, PA (US); Weimin Liu, Chatham, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/664,886

(22) Filed: Jul. 31, 2017

(65) Prior Publication Data
US 2017/0331552 A1 Nov. 16, 2017

Related U.S. Application Data

(63) Continuation of application No. 14/738,210, filed on Jun. 12, 2015, now Pat. No. 9,722,701, which is a (Continued)

(51) Int. Cl.
*H04B 10/114* (2013.01)
*H04B 10/116* (2013.01)
*H04W 48/16* (2009.01)

(52) U.S. Cl.
CPC ....... *H04B 10/116* (2013.01); *H04B 10/1143* (2013.01); *H04B 10/1149* (2013.01); *H04W 48/16* (2013.01)

(58) Field of Classification Search
CPC .............. H04B 10/116; H04B 10/1143; H04B 10/1149; H04W 48/16
(Continued)

(56) References Cited

U.S. PATENT DOCUMENTS 7,583,901 B2 9/2009 Nakagawa et al.
8,107,825 B2 1/2012 Rajagopal et al.
(Continued)

FOREIGN PATENT DOCUMENTS

CN 101159821 A 4/2008
CN 101232327 A 7/2008
(Continued)

OTHER PUBLICATIONS

ETRI, "VLC Coexistence with Lighting Control," IEEE 802.15-09-0557-01-0007, Jul. 15, 2009.
(Continued)

*Primary Examiner* — Dalzid Singh
(74) *Attorney, Agent, or Firm* — Volpe and Koenig, P.C.

(57) ABSTRACT

A visible light communication (VLC) device for lighting and data transmission is disclosed. The VLC device may comprise circuitry configured to receive a first stream of bits and determine a first switchpoint for transmitting the first stream of bits and first filler data. The VLC device may further comprise red, green, and blue (RGB) light emitting diodes (LEDs) configured to transmit the first stream of bits and the first filler data in the visible light spectrum. The first filler data may begin to be transmitted at the first switchpoint. Similar to the first stream of bits, a second stream of bits may be received and transmitted by the RGB LEDs of the VLC device. In this way, a naked eye of a human may not detect flicker of the VLC device.

19 Claims, 15 Drawing Sheets

Related U.S. Application Data continuation of application No. 14/133,733, filed on Dec. 19, 2013, now Pat. No. 9,088,361, which is a continuation of application No. 12/884,483, filed on Sep. 17, 2010, now Pat. No. 8,639,124.

(60) Provisional application No. 61/243,819, filed on Sep. 18, 2009, provisional application No. 61/243,862, filed on Sep. 18, 2009, provisional application No. 61/250,811, filed on Oct. 12, 2009.

(58) Field of Classification Search
USPC ........................................................ 398/130
See application file for complete search history.

(56) References Cited

U.S. PATENT DOCUMENTS

| | | | |
|---|---|---|---|
| 8,139,943 B2 | 3/2012 | Asukai et al. | |
| 8,188,878 B2 | 5/2012 | Pederson et al. | |
| 8,432,438 B2 | 4/2013 | Ryan et al. | |
| 8,639,124 B2 | 1/2014 | Castor et al. | |
| 2004/0085030 A1* | 5/2004 | Laflamme | H05B 33/0863 315/291 |
| 2006/0239689 A1 | 10/2006 | Ashdown | |
| 2007/0092264 A1* | 4/2007 | Suzuki | H04B 10/1141 398/189 |
| 2007/0127401 A1 | 6/2007 | Giugnard et al. | |
| 2007/0275750 A1 | 11/2007 | Nakagawa | |
| 2008/0170863 A1* | 7/2008 | Won | H04B 10/1141 398/172 |
| 2008/0215391 A1 | 9/2008 | Dowling et al. | |
| 2009/0110405 A1 | 4/2009 | Lee et al. | |
| 2009/0214225 A1 | 8/2009 | Nakagawa et al. | |
| 2010/0111538 A1 | 5/2010 | Arita et al. | |
| 2010/0254712 A1 | 10/2010 | Linnartz et al. | |
| 2010/0284690 A1 | 11/2010 | Rajagopal et al. | |
| 2010/0327764 A1 | 12/2010 | Knapp | |
| 2011/0026917 A1 | 2/2011 | Li et al. | |
| 2011/0064405 A1 | 3/2011 | Rajagopal et al. | |

FOREIGN PATENT DOCUMENTS

| | | |
|---|---|---|
| JP | 2006-094216 | 4/2006 |
| JP | 2007-013485 | 1/2007 |
| JP | 2007-274506 | 10/2007 |
| JP | 2007-295442 | 11/2007 |
| JP | 2009-117892 | 5/2009 |
| JP | 2009-177519 | 8/2009 |
| WO | 02/25842 | 3/2002 |
| WO | 11/034346 | 3/2011 |

OTHER PUBLICATIONS

Kang, "IEEE 802.15.7 VLC Regulation Document Configuration," IEEE 802.15-09-0202-02-0007, May 14, 2009.

Kaur et al., "VLC Dimming Proposal," Proposal: IEEE P802.15 Working Group for Wireless Personal Area Netowrks (WPANs), IEEE 802.15-15-09-0641-00-0007 (Sep. 2009).

Samsung Electronics, "Dimming Considerations for Visible Light Communication," IEEE 802.15-09-0369-00-0007, May 9, 2009.

Samsung Electronics, "Samsung PHY Proposal to 802.15.7," IEEE 802.15-09-0660-00-0007, Sep. 22, 2009.

Samsung Electronics, "TG7 Technical Considerations Document (TCD)," IEEE 802.15-09-0564-00-0007, Jul. 16, 2009.

* cited by examiner

METHOD AND APPARATUS FOR REDUCED FLICKER VISIBLE LIGHT COMMUNICATIONS (VLC)

CROSS REFERENCE TO RELATED APPLICATIONS

This application is a continuation of U.S. patent application Ser. No. 14/738,210, filed Jun. 12, 2015, which is a continuation of U.S. patent application Ser. No. 14,133,733, filed Dec. 19, 2013, which issued as U.S. Pat. No. 9,088,361 on Jul. 21, 2015 which is a continuation of U.S. patent application Ser. No. 12/884,483, filed Sep. 17, 2010, which issued as U.S. Pat. No. 8,639,124 on Jan. 28, 2014, which claims the benefit of U.S. Provisional Patent Application No. 61/243,819, filed Sep. 18, 2009; U.S. Provisional Patent Application No. 61/243,862, filed Sep. 18, 2009; and U.S. Provisional Patent Application No. 61/250,811, filed Oct. 12, 2009, the contents of all of which are incorporated by reference as if fully set forth herein.

BACKGROUND

Visible light communications (VLC) is a communications medium that uses visible light (e.g., light with wavelengths in the range of approximately 400 to 700 nanometers (nm) that may be seen with the naked human eye) to wirelessly transmit data (e.g., voice data, numerical data and image data). To transmit data using VLC, a visible light source, such as a fluorescent light bulb or a light emitting diode (LED), may be turned on and off or intensity modulated at a very high speed. A receiving device (e.g., a camera, a mobile telephone's imager or ambient light sensor) may receive the intensity modulated light and convert it into data that the receiving device may process for the user's use and/or enjoyment.

One major draw to VLC is the ubiquitous nature of visible light sources that may be used to transmit data to receiving devices. By way of example, lamps, consumer electronics which may include LED backlit displays and other LEDs, such as indicator lights and traffic signals, all include one or more visible light sources. Thus, visible light sources have the potential to wirelessly transmit data to a user located almost anywhere.

VLC may provide benefits such as freeing up limited radio frequency bandwidth for other uses since it does not require use of a radio frequency bandwidth. In addition, since light sources are already in place for other purposes (e.g., providing light and displaying television shows, movies and data), the light sources may be readily converted into transmitters by simply coupling them to control devices. However, one drawback to VLC is that VLC may interfere with dimming.

VLC may be used in a variety of applications, including but not limited to the categories listed in Table 1 below.

TABLE 1

| Node | Definition | Application Examples |
| --- | --- | --- |
| Infrastructure | Networked communications node installed at a permanent location | VLAN, ATM Machine |
| Mobile | Low mobility device, may include fixed devices | PDA |
| Vehicular | High mobility node associated with transportation applications | Automobile |

SUMMARY

A VLC device for lighting and data transmission is disclosed. The VLC device may comprise circuitry configured to receive a first stream of bits and determine a first switchpoint for transmitting the first stream of bits and first filler data. The VLC device may further comprise red, green, and blue (RGB) LEDs configured to transmit the first stream of bits and the first filler data in the visible light spectrum. The first filler data may begin to be transmitted at the first switchpoint. Similar to the first stream of bits, a second stream of bits may be received and transmitted by the RGB LEDs of the VLC device. In this way, a naked eye of a human may not detect flicker of the VLC device.

BRIEF DESCRIPTION OF THE DRAWINGS

A more detailed understanding may be had from the following description, given by way of example in conjunction with the accompanying drawings wherein.

DETAILED DESCRIPTION

Figure 1A:
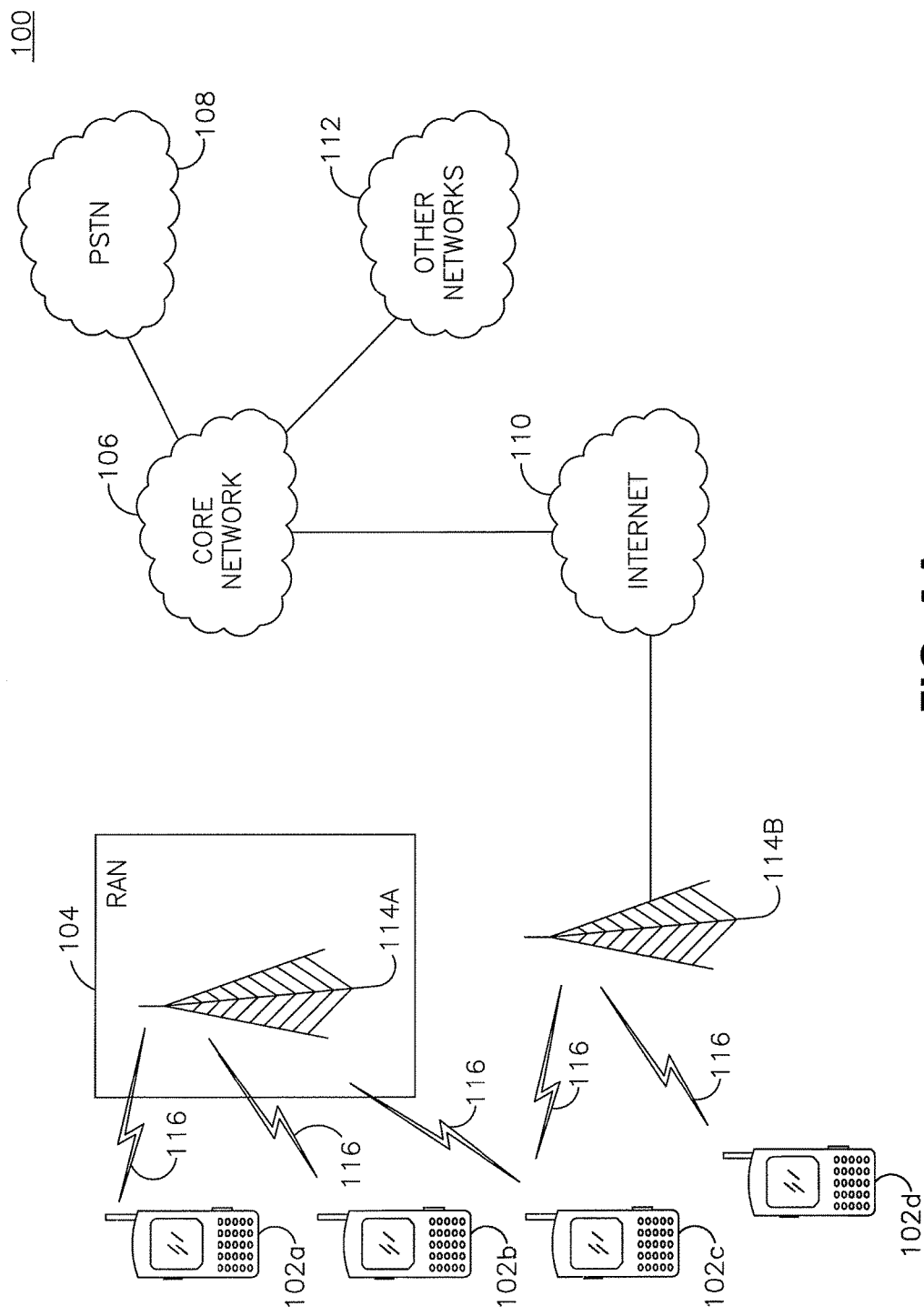
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, an access network (AN) or radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, a media transfer protocol (MTC) device, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a network controller or a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable access technology or radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable access technology or RAT for facilitating wireless connectivity in a localized area, such as a place of business, a home, a vehicle, a campus, and the like. In one embodiment, the base station 114b and the WTRUs 102c, 102d may implement a technology such as IEEE 802.11 to establish a wireless local area network (WLAN). In another embodiment, the base station 114b and the WTRUs 102c, 102d may implement a technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
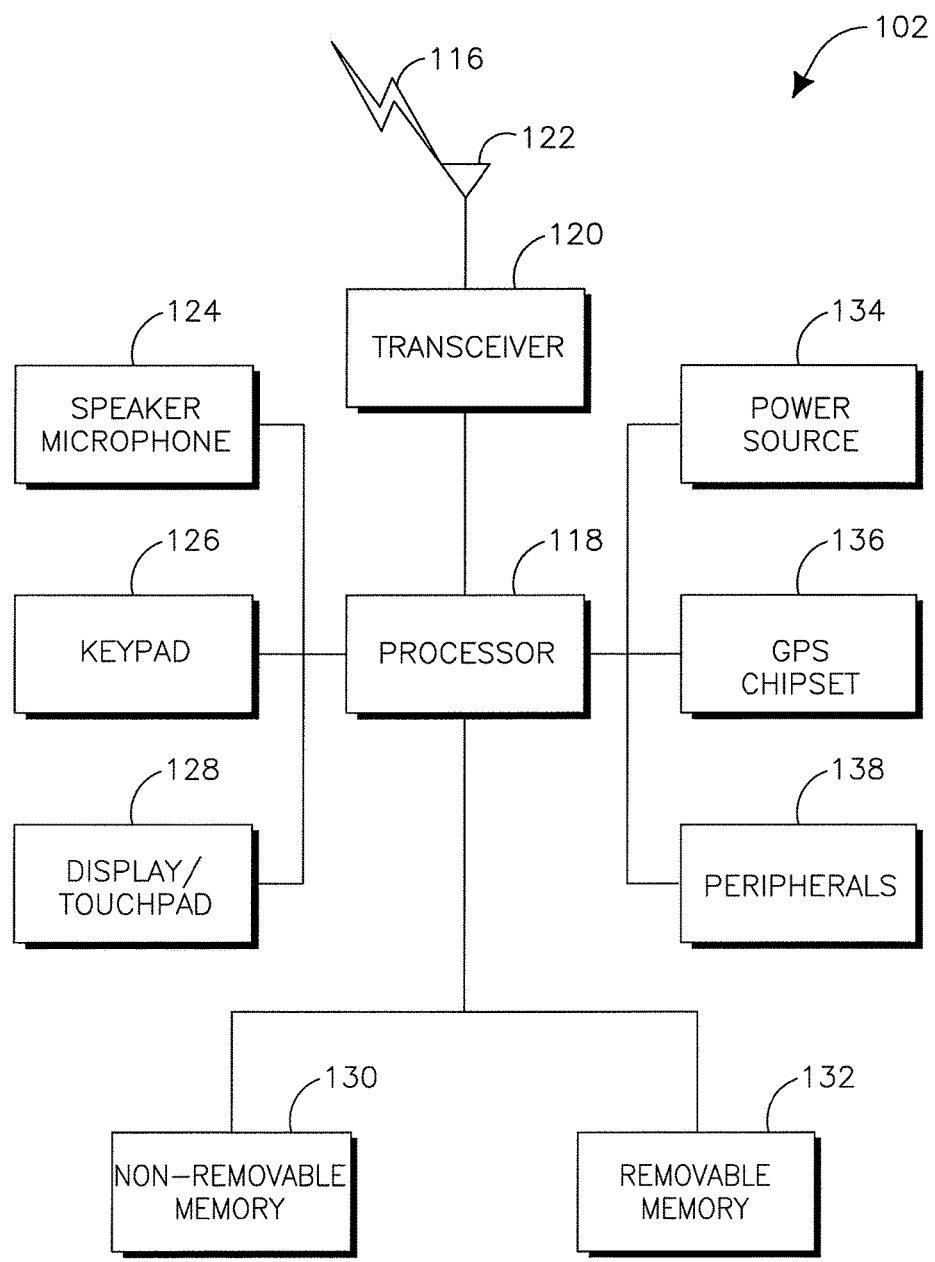
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 2:
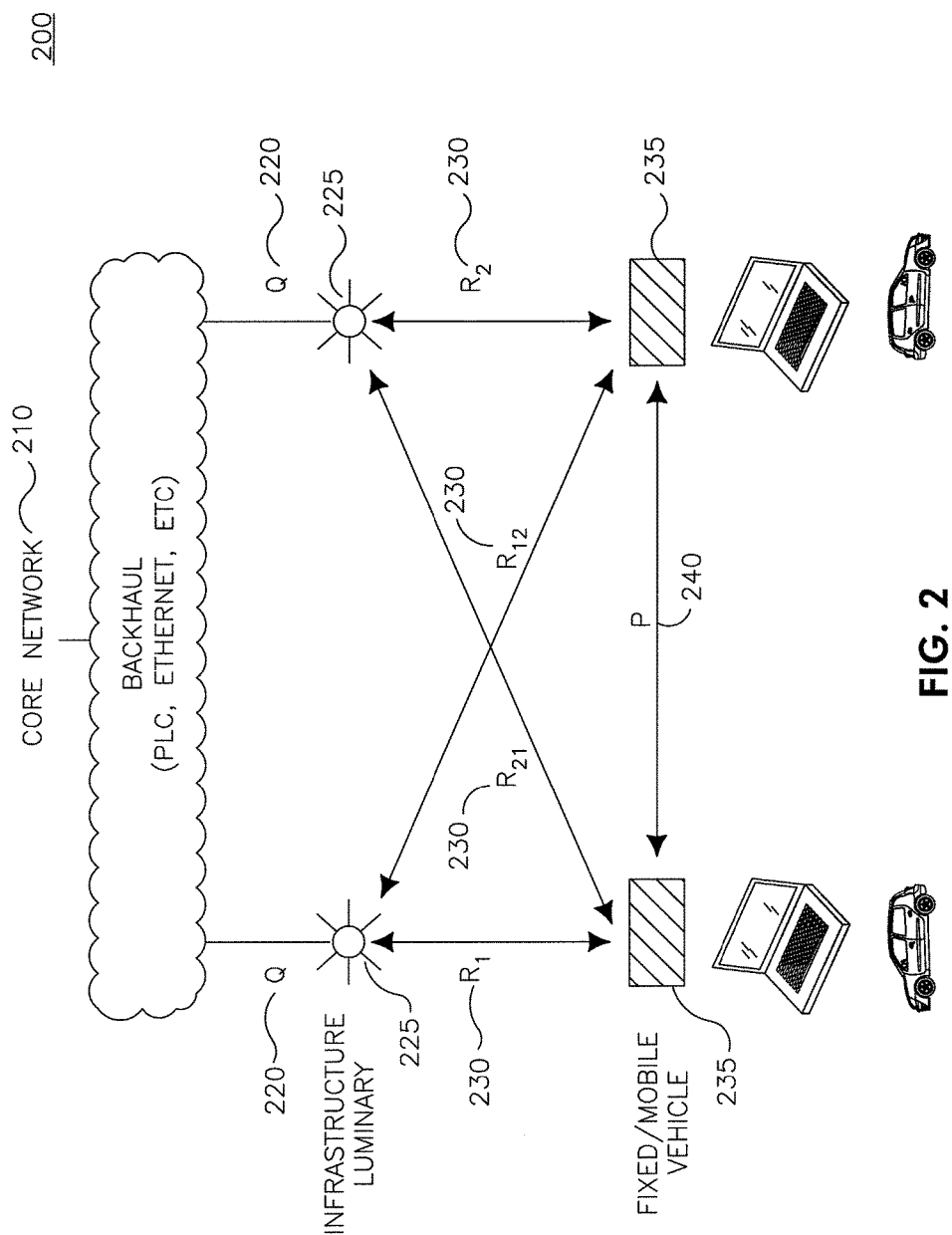
FIG. 2 shows an IEEE 802.15.7 network topology including communication interfaces.

FIG. 2 shows an IEEE 802.15.7 network topology including communication interfaces 200. A core network (CN) 210 may be connected to an infrastructure node 225 via a Q interface 220, using a technology including but not limited to power line communication (PLC) or Ethernet. The infrastructure node may be connected to a fixed, mobile or vehicle node 235 using an $R_x$ interface 230, which may be a VLC link. An $R_x$ interface 230 may be an inter-luminary interference used for spatial multiplexing. The P interface 240 may indicate peer-to-peer (P2P) communication that may not include connectivity to a network.

VLC may be used with a variety of applications and topologies including P2P, infrastructure and simplex, wherein each topology may include a particular mode. An infrastructure topology may include an infrastructure mode that provides features for communications while maintaining illumination as a primary function of a LED source. Dimming may be implemented in this mode so that data throughput is maximized and multiplexing may be used to support multiple end users. In addition, interference from an unintended light source may be rejected in this mode. Also, the infrastructure node in this mode may be linked using an $R_x$ interface 230.

In a P2P topology, a P2P mode may use spatial separation to limit interference from other VLC sources. Maximum data rate may be achieved in this mode by eliminating added signaling and physical layer redundancy. Also, the P2P node in this mode may be linked using a P interface 240.

In addition to the P2P and infrastructure modes, VLC may utilize a simplex mode to allow visible light links to work as a complimentary wireless access technology with uni-directional support. This may allow visible light links to operate as a uni-directional broadcast channel. Also, retransmissions may be repeated a fixed number of times with no dependency on an external entity.

Figure 3:
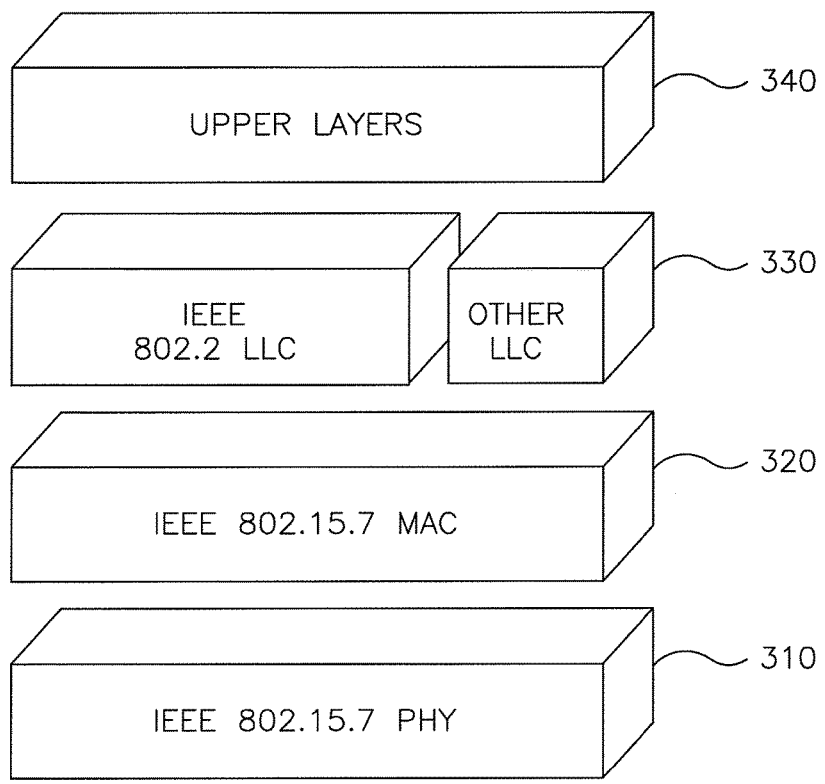
FIG. 3 shows an IEEE 802.15 topology stack.

FIG. 3 shows an IEEE 802.15 topology stack 300. Both the physical (PHY) 310 and MAC 320 layers are included. Above the MAC layer may exist logical link control (LLC) layers 330. In simplex mode, medium access control (MAC) protocols may provide the receipt of control information including acknowledgments (ACK) and channel quality measurements from an external entity outside the MAC. Other LLC sublayers may also be included in the VLC architecture 340.

Figure 4:
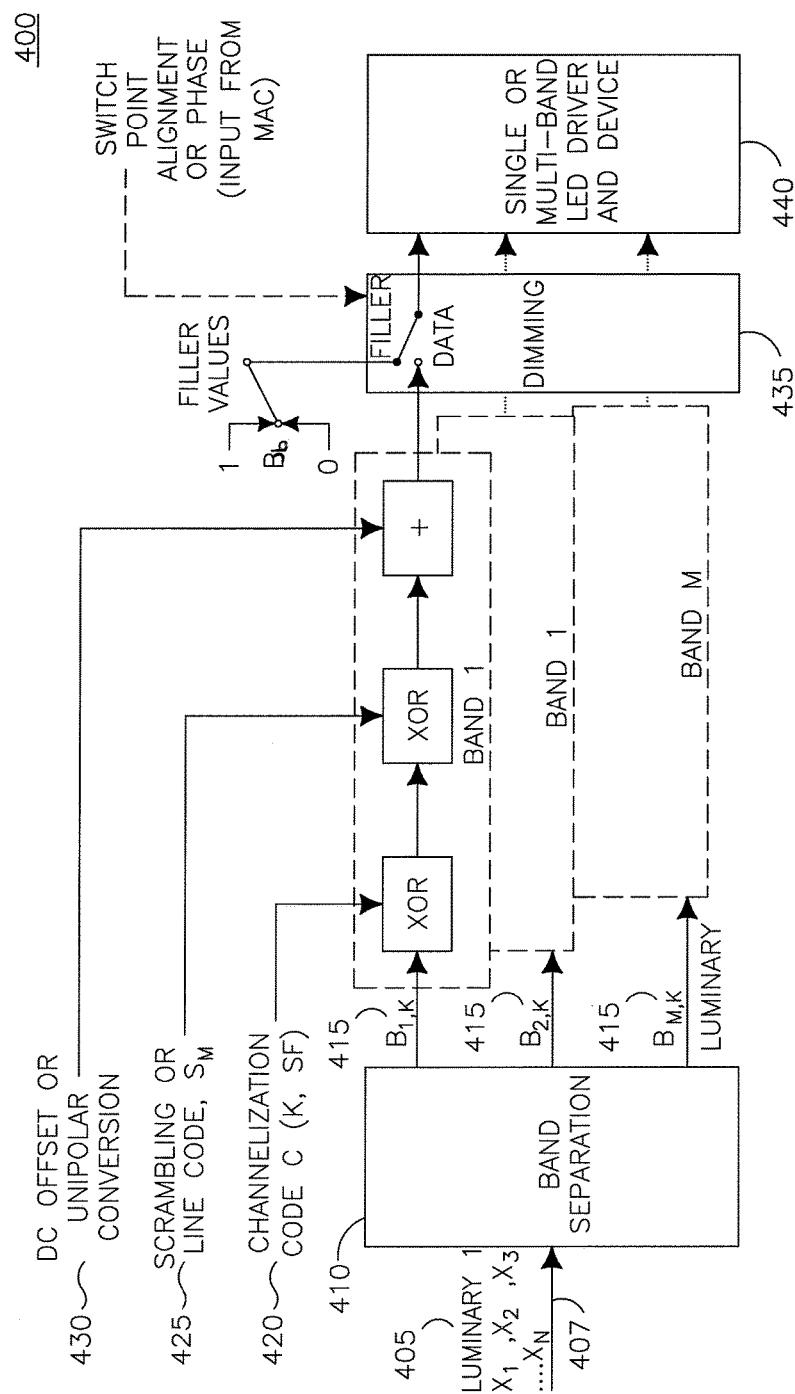
FIG. 4 is a block diagram of the VLC Physical data flow using one luminary.

FIG. 4 is a block diagram of VLC PHY data flow including separation and aggregation of bands of data using one luminary 400. In FIG. 4, a luminary 405 is used to show a single data flow in order to illustrate interference in a communications channel. A stream of bits $x_1, x_2, x_3, \ldots x_N$ 407, used as an input vector of length N, are input into a PHY band separator 410, where N is the size of the MAC protocol data unit (PDU). Bit padding of "0" is used to ensure the length of the vector is N, which is a multiple of M, where M is the total number of bands of data, or colors:

$$N' = M\left\lceil \frac{N}{M} \right\rceil.$$  Equation [1]

The stream of bits 407 input into the band separator block 410 are denoted as $x_1, x_2, x_3, \ldots x_N$. The band separator 410 aggregates the stream of bits across multiple bands of data 415. The output of the band separator 410 are M bands of data, $b_m$, 415. Each band of data includes data bits that are mapped through the band separator. The mathematical representation of the mapping of data bits through the band separator may be determined by the following equations which show how input bits x are multiplexed into the bits b in each band:

$$b_{m,k} = x_{M(k-1)+m}$$  Equation [2]

$$k = 1, 2, 3, \ldots, X$$  Equation [3]

$$X = \frac{N'}{M}$$  Equation [4]

$$m = 1, 2, \ldots, M.$$  Equation [5]

Where k is the channel number, X is the total number of channels, m is a band of data, and $b_{m,k}$ is the data.

To provide maximum capacity in infrastructure systems when multiple bands of light are used, the PHY separates and aggregates data through the band separator 410. Each data symbol sent in parallel over the air interface is converted to a serial data stream, starting with the symbol at the lowest wavelength band to the highest wavelength band. In infrastructure topologies, support for multiple wavelengths or bands is provided. These bands may be associated with colors of the visible light spectrum and different wavelengths, where different wavelengths correspond to different colors of the visible light spectrum. When the bands are multiplexed together the overriding color is white light.

For each band in, the data $b_{m,k}$ is spread by a channelization code C(k,SF) at the channelization block 420, which is specific to a luminary, where (SF) is the spreading factor of the code and k is the channel number:

$$0 \leq k \leq SF-1$$  Equation [6].

In other words, the (SF) is the number of luminaries at use, and k is the index of a particular luminary.

A scrambling code $s_m$ or line code may then be applied at the scrambling or line code block 425 to each band of data. Conversion to unipolar data may then occur at the direct current (DC) offset or unipolar conversion block 430 for each band of data. ADC offset or conversion to unipolar signaling may be necessary to provide consistency with on/off keying (OOK) of the LED light source.

In order to transmit data while maintaining brightness of the luminary, dimming is implemented. Dimming is performed at a dimming block 435. A desired brightness level is received at the dimming block 435. Based on the desired brightness level, a data duty cycle for transmission of data is determined. Filler luminance values are determined based on the received brightness level. Filler luminance values of either a "1" or a "0" are added to the data prior to conversion to light by the single or multi-band LED device 440 allowing for the alternation of data and light on the luminary.

Another aspect of the VLC network topology concerns PHY band separation and aggregation. For the infrastructure VLC, single-chip (band) based LEDs may be used for an energy efficient solution, while three-chip (band) (i.e., RGB) LEDs may provide increased data rate. In the case of RGB, white light is still desired for the primary function of illumination, meaning that all bands are active. Therefore, in the interest of maximizing data capacity, each band may be used by each luminary. Any band that remains active for the purpose of illumination, and does not carry data, may add to the system interference and lower overall capacity.

PHY multiplexing provides independent channels among multiple luminary sources (inter-luminary) so that multiple luminary sources may exist at the same time. PHY multiplexing allows the separation of signals from one luminary source to another. In infrastructure topologies, interference among luminary sources may be mitigated using code division multiplexing (CDM). Variable length spreading codes are defined where the spreading factor is equal to the reuse factor, or number of channels desirable within a geographic area.

Figure 5:
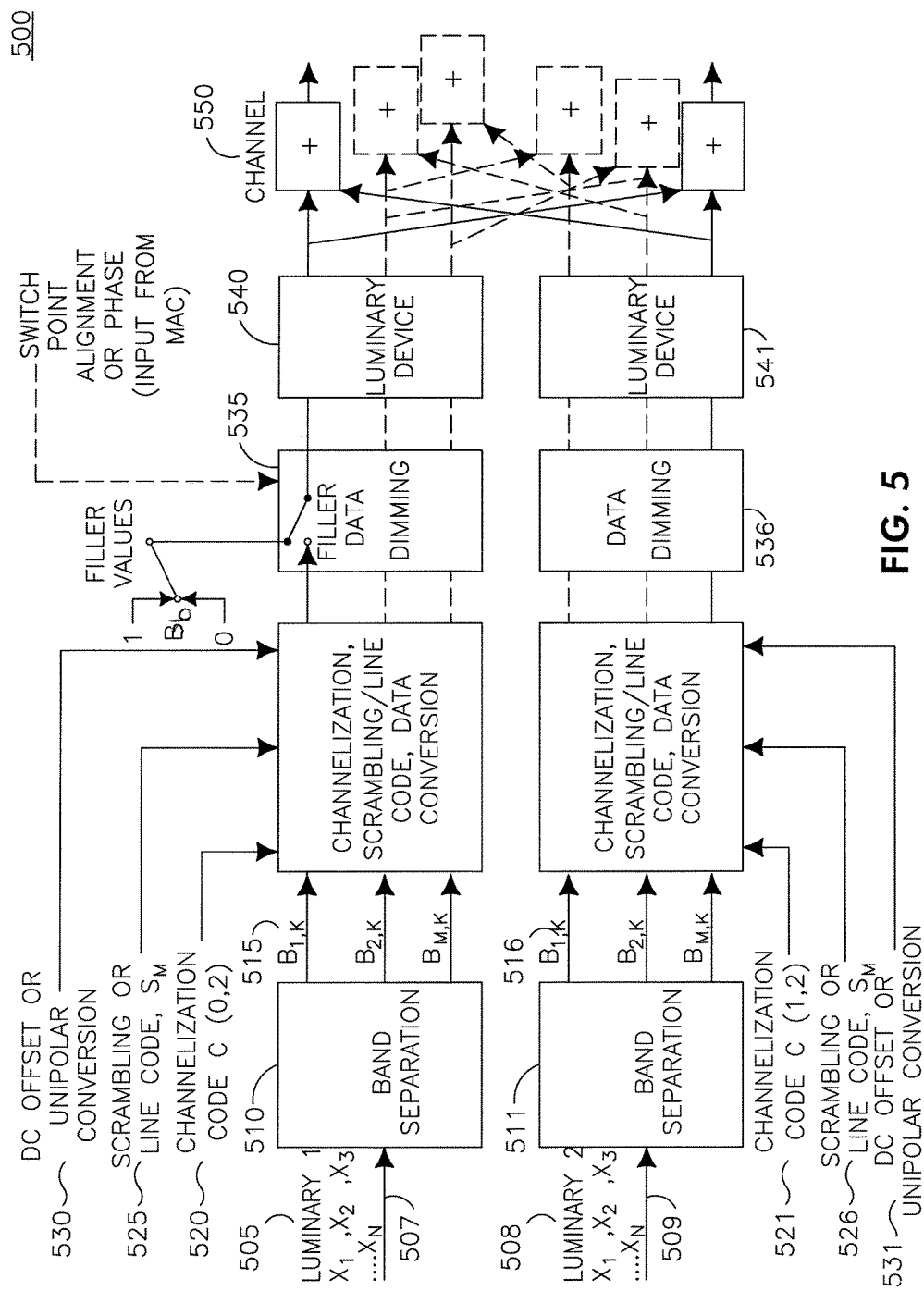
FIG. 5 shows a multi-luminary architecture.

FIG. 5 shows a multi-luminary architecture 500. In FIG. 5 two data flows, or two luminaries 505, 508, are shown. A plurality of luminaries may exist at one time. A stream of bits $x_1, x_2, x_3, \ldots x_N$ 507, 509, for each luminary may be used as an input vector of length N and input into a PHY band separator 510, 511. Bit padding of "0" is employed to ensure the length of the vector is N, which is a multiple of M using Equation [1]. The output of the band separator 510, 511, may be M bands of data 515, 516, for each luminary 505, 508.

The channelization code, C(k,SF), is applied to each band of data at the channelization code block 520, 521. A scrambling or line code $s_m$ may then be applied to each band of data at the scrambling or line code block 525, 526. If there are more luminaries than spreading codes, then at least two luminaries may have the same spreading code. In this case, different scrambling codes may be used. At an input port or a receiver, there may be interference among the luminaries. However, the interference is reduced by the (SF). Interference may be mitigated by using CDM using Walsh codes and variable spreading based on a system reuse parameter. Conversion to unipolar data may occur at a DC offset or unipolar conversion block 530, 531, for each band of data.

Dimming may be performed at a dimming block 535, 536, for each band of data. A desired brightness level is received at each the dimming block 535, 536. Based on the desired brightness level, a data duty cycle for transmission of data is determined. Filler luminance values are based on the received brightness level. Filler luminance values of either a "1" or a "0" are added to the data prior to conversion to light by the single or multi-band LED device 540, 541 before the bands are output to a transport channel 550. The value of the filler luminance values or filler bits, $b_B$, is determined from the equation:

$$b_B = \begin{cases} 0, & L < B \\ 1, & L \geq B \end{cases}. \quad \text{Equation [7]}$$

Wherein B is the average brightness of a given modulation and L is the desired illumination level.

Data transmission and reception are performed using transport channels 550 provided by the VLC physical layer. There are two different types of transport channels according to their objectives and characteristics, the broadcast channel (BCH) and the shared traffic channel (STCH). The BCH is a downlink channel that broadcasts the current status of the system and cells to entire cells. The STCH is a channel used for user data transmission. Since this channel is shared by many users, data flow on this channel is managed by a scheduler and a medium access mechanism. The STCH is used for both uplink and downlink communications.

Figure 6:
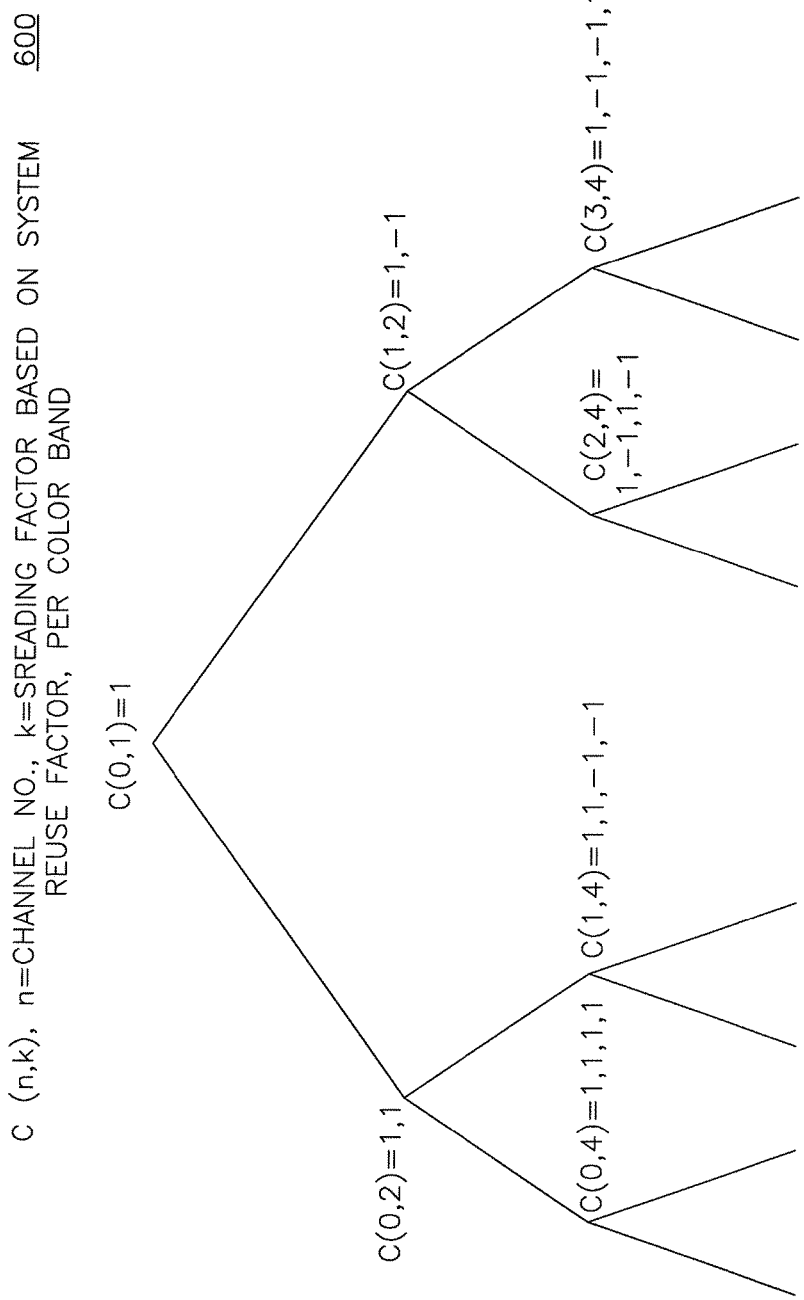
FIG. 6 shows a Walsh Code Tree for use in VLC.

FIG. 6 shows a Walsh Code Tree for use in VLC. Walsh spreading codes are orthogonal. Accordingly, if luminaries are assigned different spreading codes and identical scrambling codes, and if they are transmitting synchronously, they may be separated by the receiver, and may not interfere with each other. This property may be used to solve the "near-far" problem commonly encountered in wireless transmission. The near-far problem is a condition in which a strong signal is captured by a receiver making it impossible for the receiver to detect a weaker signal. By using Walsh coding with synchronization, where the codes are orthogonal, the near far problem is reduced.

Walsh codes have a property such that the channelization code C(0,SF) is a pure DC offset while all other codes have no DC offset component. After scrambling, each code may result in a random DC offset component. Low-frequency ambient noise may still interfere with transmission, however, the impact is reduced by a factor of SF compared to using OOK.

Figure 7:
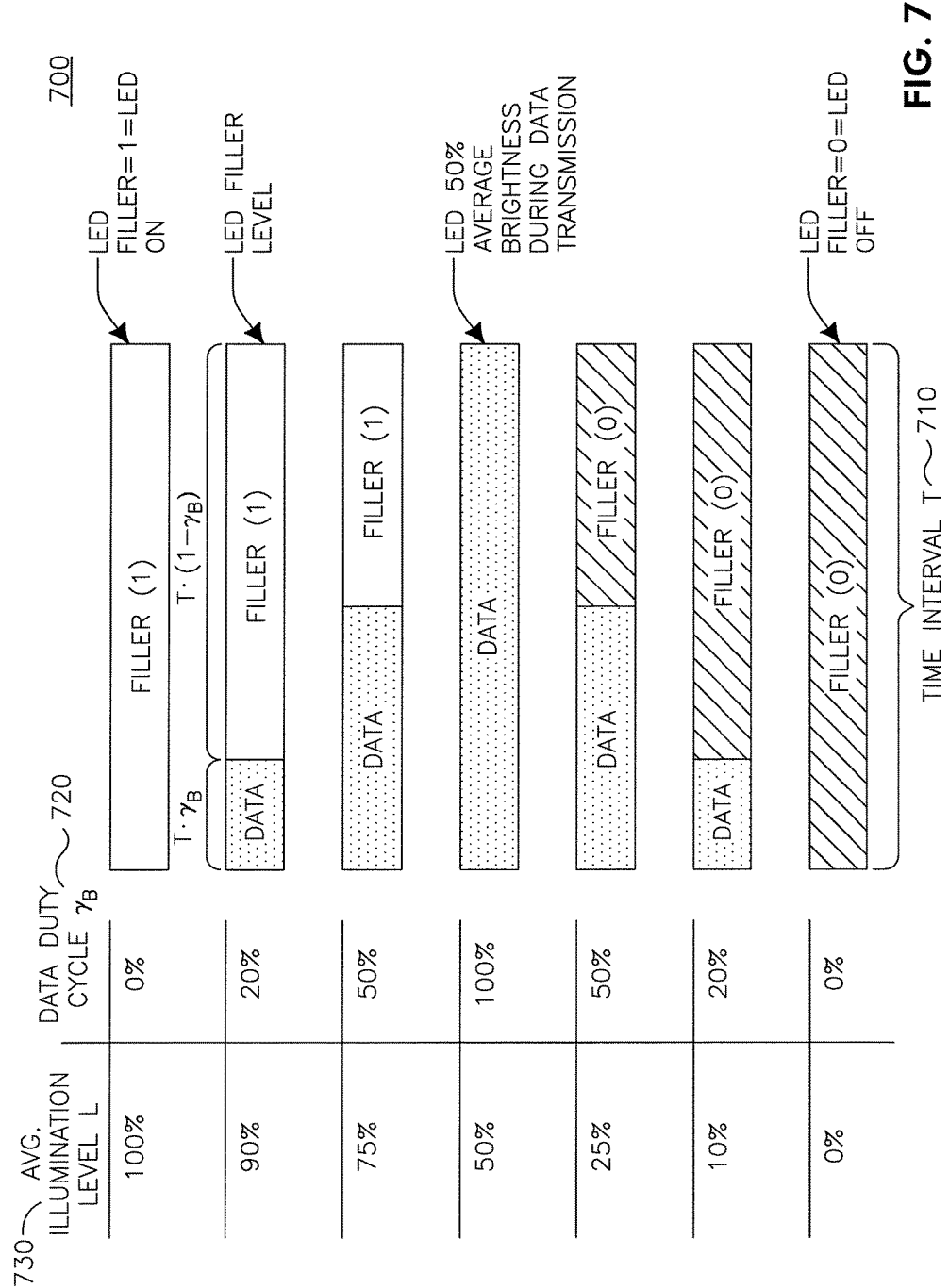
FIG. 7 shows an example of a data duty cycle.

FIG. 7 shows an example of a data duty cycle 700. While VLCs may use indoor lighting, the primary function of indoor lighting is lighting while VLC is a secondary function. In order to maintain communications while changing the brightness of the lights, dimming is implemented. The brightness of the light corresponds to the portion of on/off periods of the light. When lights are turned off very quickly, the naked eye cannot detect the flicker. If the light is on more often than it is off, the light may appear brighter than if the light is off more often than on. The flow of data using VLC is mapped to the on time of the lights. In order to achieve a desired brightness and a maximum transmission level for data, a data duty cycle is implemented.

In FIG. 7, over a time interval T 710, a data duty cycle 720 is highest, meaning the maximum amount of data may be sent, when the average illumination level 730 is half of the maximum illumination level. For example, at 50% illumination level the data duty cycle operates at 100%. The data duty cycle is lowest, meaning the minimum amount of data is sent, when the brightness is highest or lowest. For example, when the average illumination level is at 100%, meaning the light is on, no data is transmitted and when the average illumination level is at 0%, meaning the light is off, no data is transmitted.

When the minimum amount of data is sent and brightness is at its highest, the LED filler luminance value is 1. A LED filler luminance value of 1 is equivalent to the LED being on, which may indicate that the lights are on. When the minimum amount of data is sent and brightness is at its lowest the LED filler is 0. A LED filler of 0 is equivalent to the LED being off, which may indicate that the lights are off. The average illumination level, L, over the time interval T, is a function of the data transmission duty cycle $Y_B$ and the LED filler level, when no data is transmitted.

The desired brightness of a light source may be controlled by varying or modulating the length of the duty cycle of an active data transmission. Dimming is used as a link power control for communications. When the average illumination level is less than 100% and more than 0%, data may be sent. When data is sent, the light is dimmed by a percentage.

When the average illumination level is above 50%, dimming allows the data duty cycle to increase, when the average illumination level is below 50%, further dimming forces the data duty cycle to decrease. Data transmission is at the highest rate when the average illumination level is at 50%. At the absolute maximum brightness level and in total darkness, no data transmission is possible.

When multiple luminaries are dimmed separately, they may have different data duty cycles. In order to minimize interference, phasing of the duty cycles of the multiple luminaries may be staggered. The phase of the duty cycles may be controlled by timing of the switchpoint alignment or phase signal in the dimming block 535, 536, that is input from the MAC.

Optimum performance in terms of interference is achieved when the data transmission in the duty cycles of the multiple luminaries have minimum overlap. This is achieved by either estimating or removing a filler bit. When a filler bit value is zero, there may not be interference to the data.

Figures 8, 9:
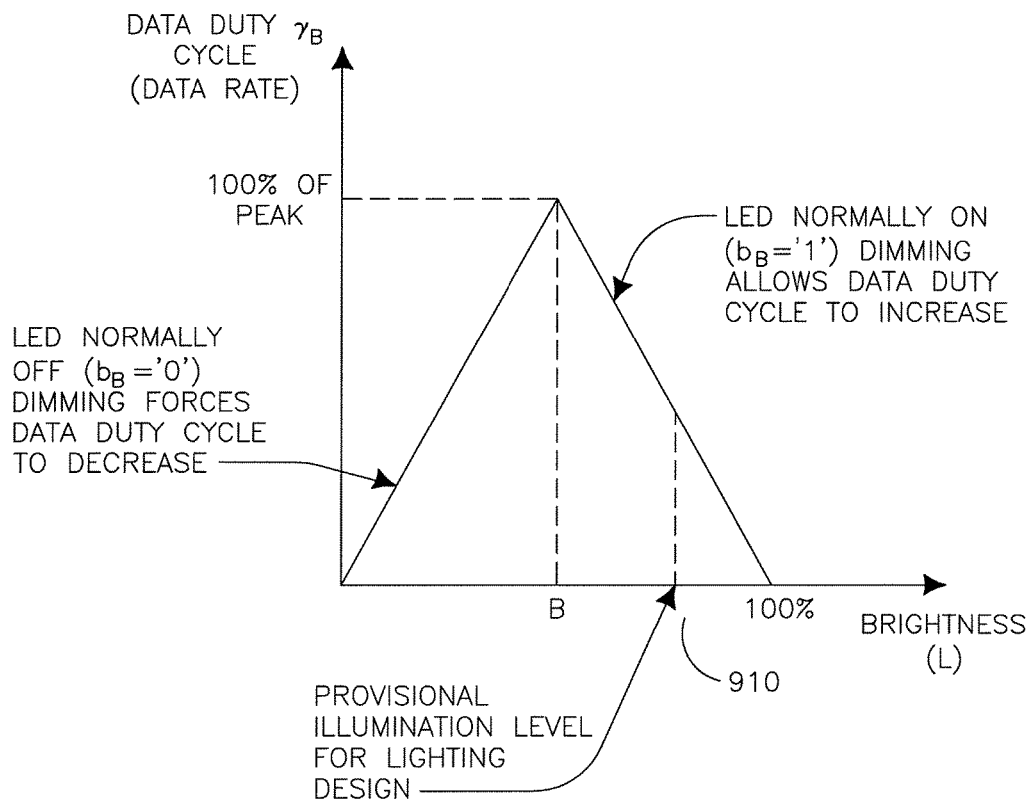
FIG. 8 shows examples of the average brightness of modulations.
FIG. 9 shows a relationship between the data duty cycle and a desired dimming or brightness level.

FIG. 8 shows an example of the relationship between the average brightness, B, of LEDs and different methods of modulating a transmission 800. For example, data transmission may be determined by OOK or by Manchester modulation, where the average brightness during data transmission is 50% of the peak brightness. In another example, data transmission may be determined by 4 pulse-position modulation (4-PPM) where the average brightness during data transmission is 25% of the peak brightness.

FIG. 9 shows a relationship between the data duty cycle, $\gamma_B$, and a desired dimming or brightness level. A provisional illumination level 910 that may be below the absolute maximum LED brightness allows for a minimum level of data transmission. Where L is the average illumination level desired by a user and B is the average brightness of a given modulation.

Figure 10:
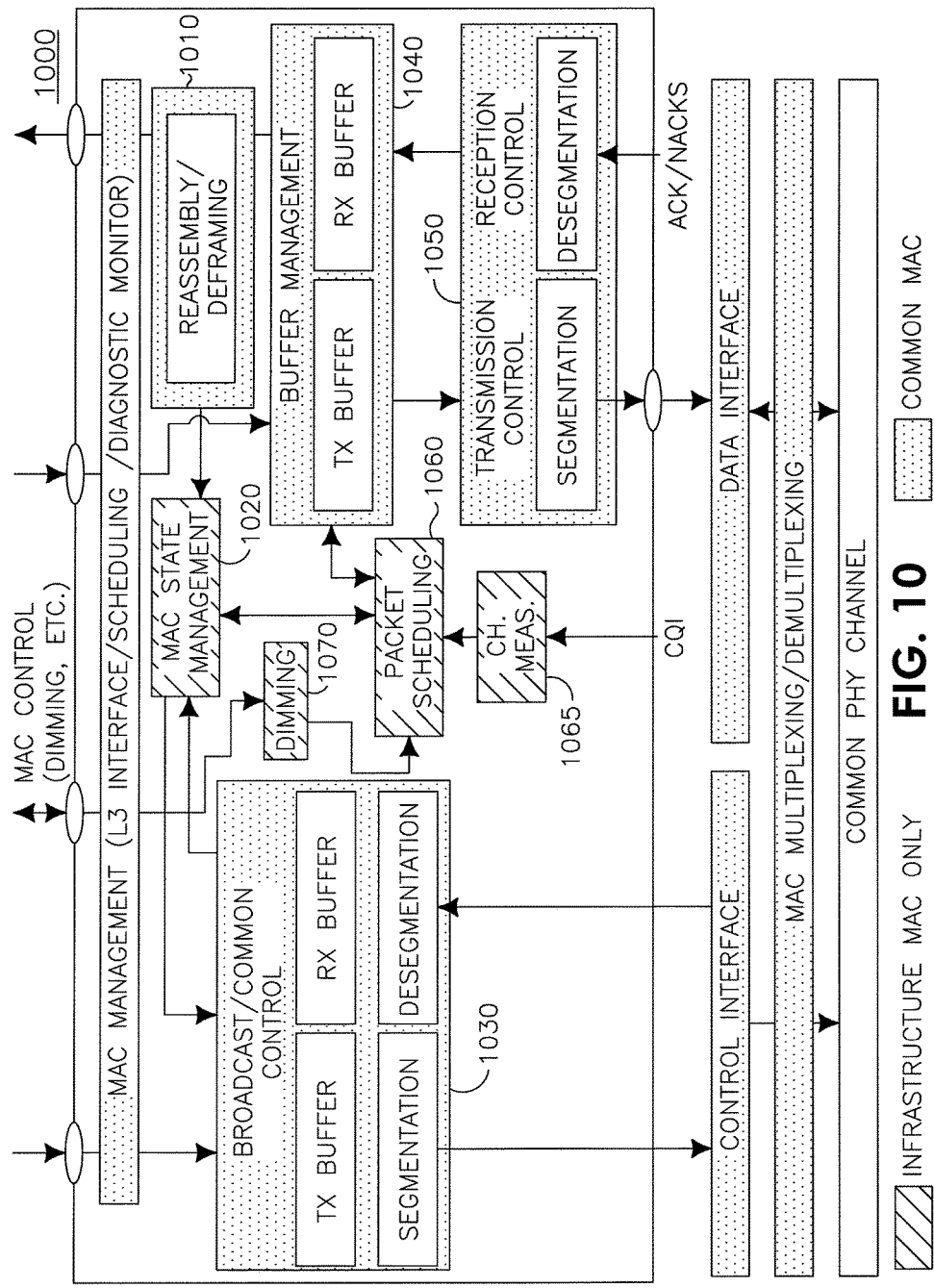
FIG. 10 shows an embodiment of VLC in the MAC architecture.

FIG. 10 shows an embodiment where VLC is present in the MAC architecture 1000. The MAC subsystem interfaces with upper layers via control and data signaling. The MAC subsystem performs various functions including classification and distribution of control and traffic packets for interfacing with the upper layer, state management of the WTRUs, depending on the existence of data to be transmitted, packet scheduling, and downlink broadcasting for information delivery.

The MAC sublayer is responsible for access to the physical channels and is responsible for such tasks including but not limited to: (1) dimming control; (2) broadcast and common data; (3) packet scheduling; (4) employing time division multiplexing (TDM) for multiple access within a luminary; and (5) data framing including segmentation and assembly.

Several functional blocks are utilized in order to perform the above functions including but not limited to: (1) Reassembly/Deframing Block 1010; (2) State Management Block 1020; (3) Broadcasting/Common Control Block 1030; (4) Buffer Management Block 1040; (5) Transmission/Reception Control Block 1050; and (6) Packet Scheduling Block 1060.

In FIG. 10, the mobile equipment MAC is a subset of the infrastructure MAC. A dimming control 1070 is administered prior to packet scheduling 1060. The dimming control 1070 includes a color quality index which is used to schedule and manage data flow. The MAC controls dimming by accepting a desired average illumination level, L, as a MAC input, and determining the duty cycle, $\gamma_B$ from the equation:

$$\gamma_B = \begin{cases} \dfrac{L}{B}, & L < B \\ \dfrac{1}{1-B}(1-L), & L \geq B \end{cases} \quad \text{Equation [8]}$$

Where B is the average brightness of a given modulation. Both the data flow and the size of the data package are based on dimming and channel measurements 1065 including but not limited to the channel quality index (CQI), the color quality index and power level.

Figure 11:
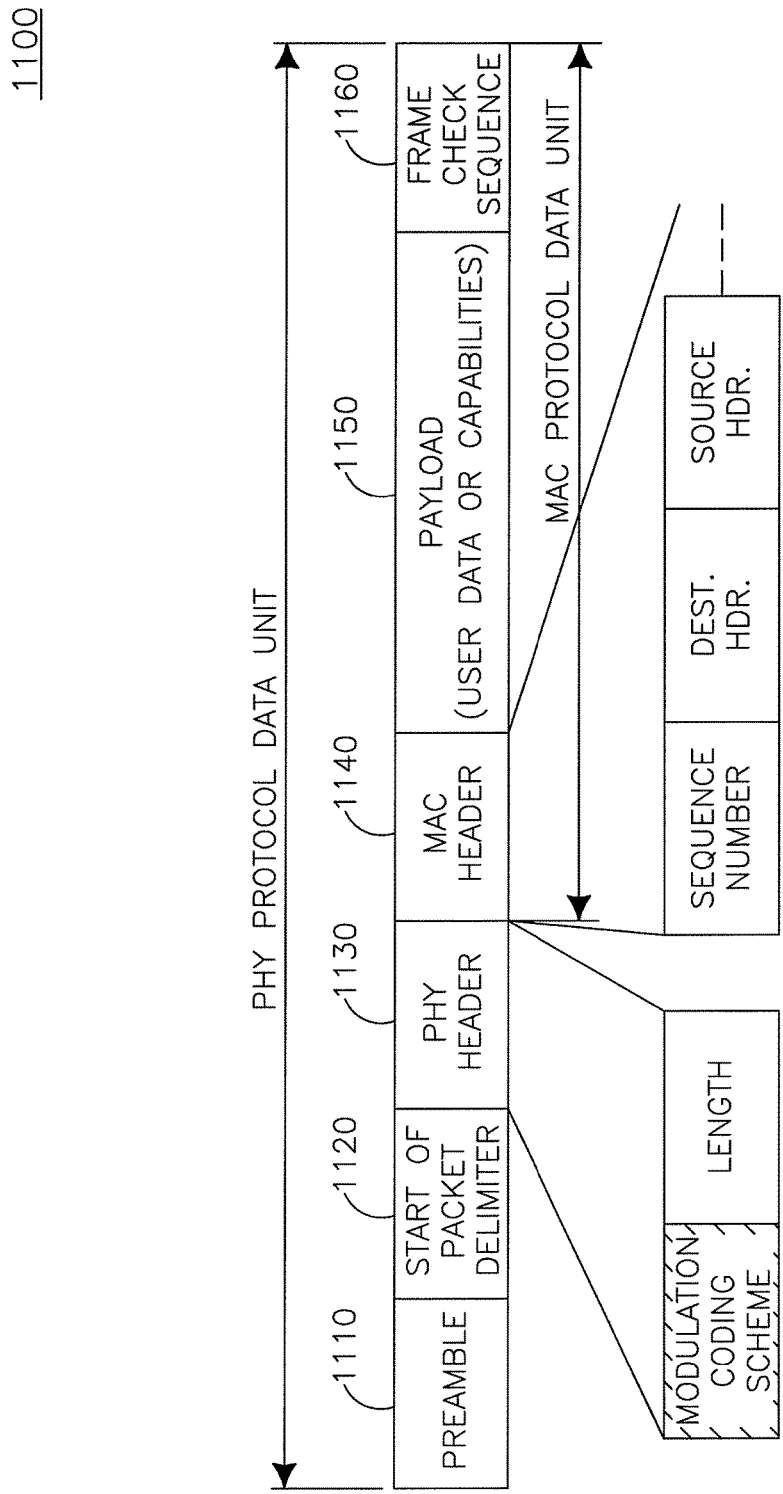
FIG. 11 shows a proposed MAC protocol data unit (PDU)

FIG. 11 shows a MAC protocol data unit (PDU) 1100 of size $N_{PDU}$. The structure for the MAC PDU includes a preamble, a PHY header 1130, a MAC header 1140, a start of packet delimiter 1120, a payload 1150 and an optional frame check sequence 1160. The preamble 1110 may be used for receiver timing and synchronization. The size of the MAC PDU may be computed as:

$$N_{PDU} = N_F \gamma_B \alpha \quad \text{Equation [9]}$$

where $N_F$ is the size of the physical layer data frame (including filler bits), $\gamma_B$ is the data duty cycle and $\alpha$ is the FEC code rate.

The MAC multiple access feature may be used within a luminary (intra-luminary) for the purpose of providing data service to multiple users under a luminary.

Figure 12:
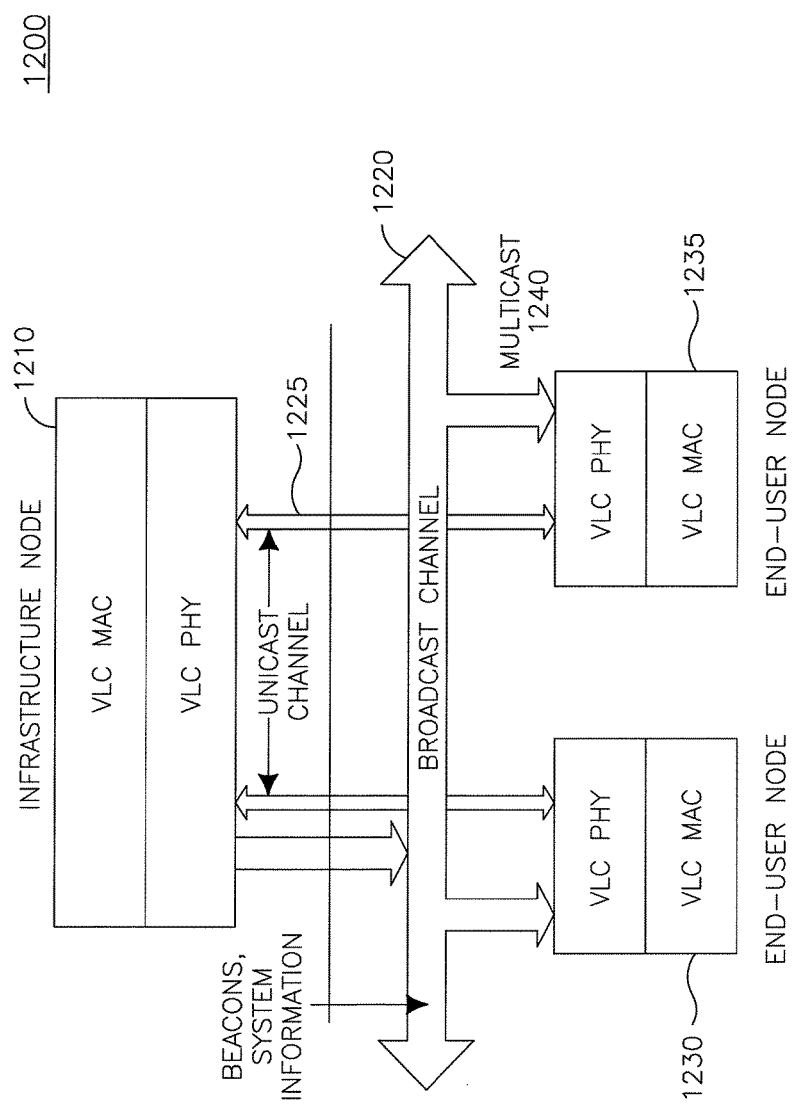
FIG. 12 shows MAC multiplexing and multiple access.

FIG. 12 shows an example of MAC multiplexing and multiple access. The MAC multiple access feature may be used within a luminary (intra-luminary), or infrastructure node 1210, for providing data service to multiple end-user nodes 1230, 1235. MAC channelization may be done through logical channels which include broadcast channels 1220, multicast channels 1240 and unicast channels 1225. Broadcast channels may be used for system information. Unicast and multicast channels may be used for user or group data.

The logical channels may be related to the types and contents of data transferred over the air or radio interface. There may be different categories of data traffic mapped to the logical channels. The broadcast channel may be a downlink only channel that is used to broadcast capabilities of the infrastructure node and current status of the system to the entire luminary domain. The broadcast channel may be mapped to Broadcast Control Channel (BCH). The multicast channel may be a downlink only channel that is used to send common user-data transmissions to a subgroup of users. It may be mapped to a shared traffic channel (STCH). In addition, per-packet identification of the group may be made using a multicast MAC address. The unicast channel may be the point-to-point duplex channel between the infrastructure node and each of the end-user nodes. It may be used to carry user data transmissions and is mapped to the STCH.

Figure 13:
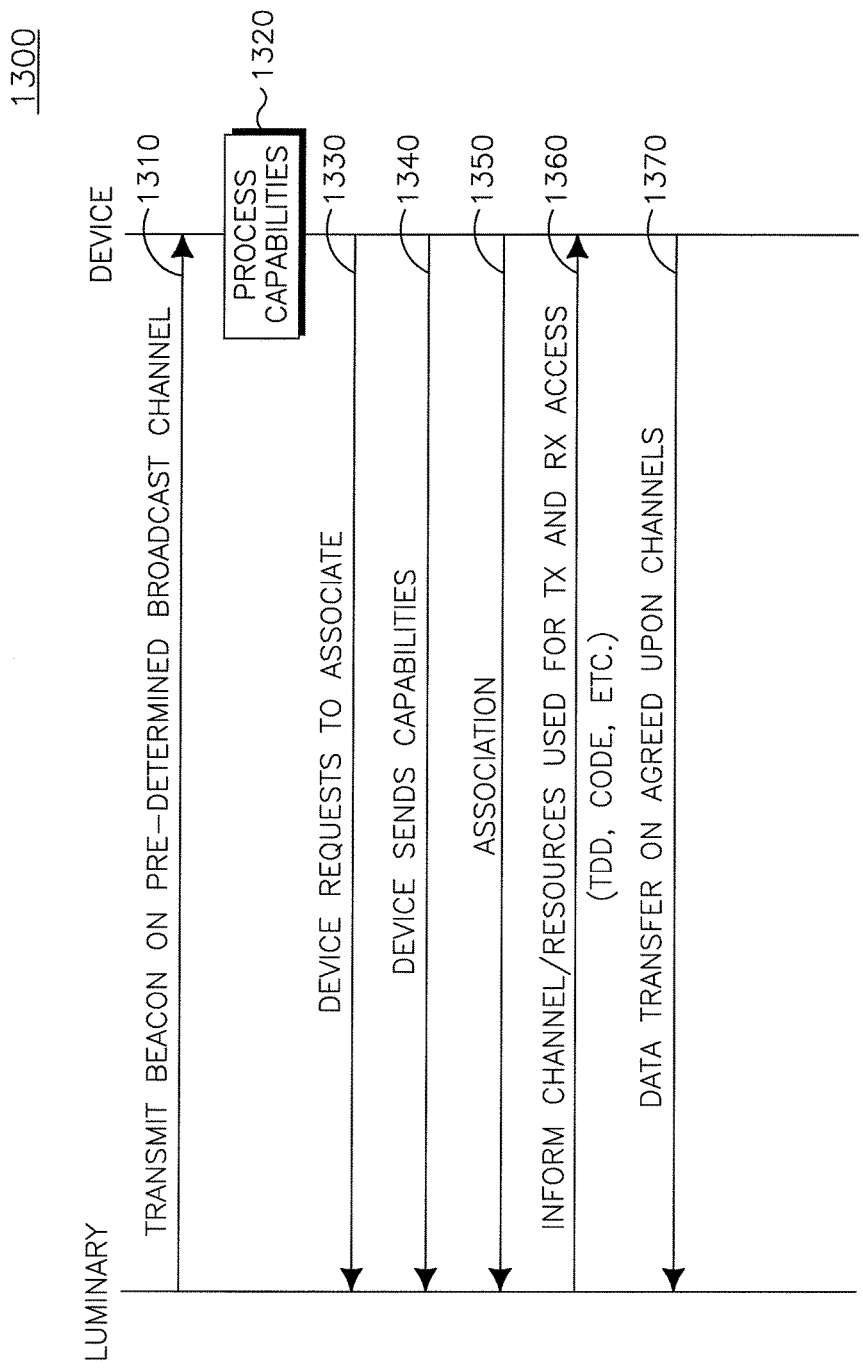
FIG. 13 is a flow diagram of the discovery procedure.

FIG. 13 is a flow diagram of the discovery procedure 1300. The discovery procedure encompasses the process by which an end-user discovers a luminary with which to associate. The discovery and association process begins with a newly turned on end-user device receiving beacons from all nearby infrastructure luminaries. Upon entering a luminary domain, a new device starts receiving on a configured channel. At periodic intervals, the luminary sends a beacon including capabilities on the broadcast channel 1310.

A device receiving the beacon makes a decision based on the capabilities received. The device processes the capabilities received from the luminary infrastructure node. The capabilities include PHY capabilities, MAC capabilities, uni-directional traffic support, bi-directional traffic support, dimming support, and visibility support 1320. The end-user device performs a selection algorithm to determine the luminary with which it would like to associate with based on the received capabilities, which may also include signal measurements and data rate requirements. The end-user device sends a request-to-associate to the selected luminary, thereby initiating the association process 1330-1350. Once the luminary confirms that it has associated with the end-user, additional information is transmitted including resource allocation information, transmission (TX) and receiving (RX) information, CDMA parameters and bands available for use 1360. The end-user may be able to exchange data with the luminary on the agreed upon channels 1370.

Figure 14:
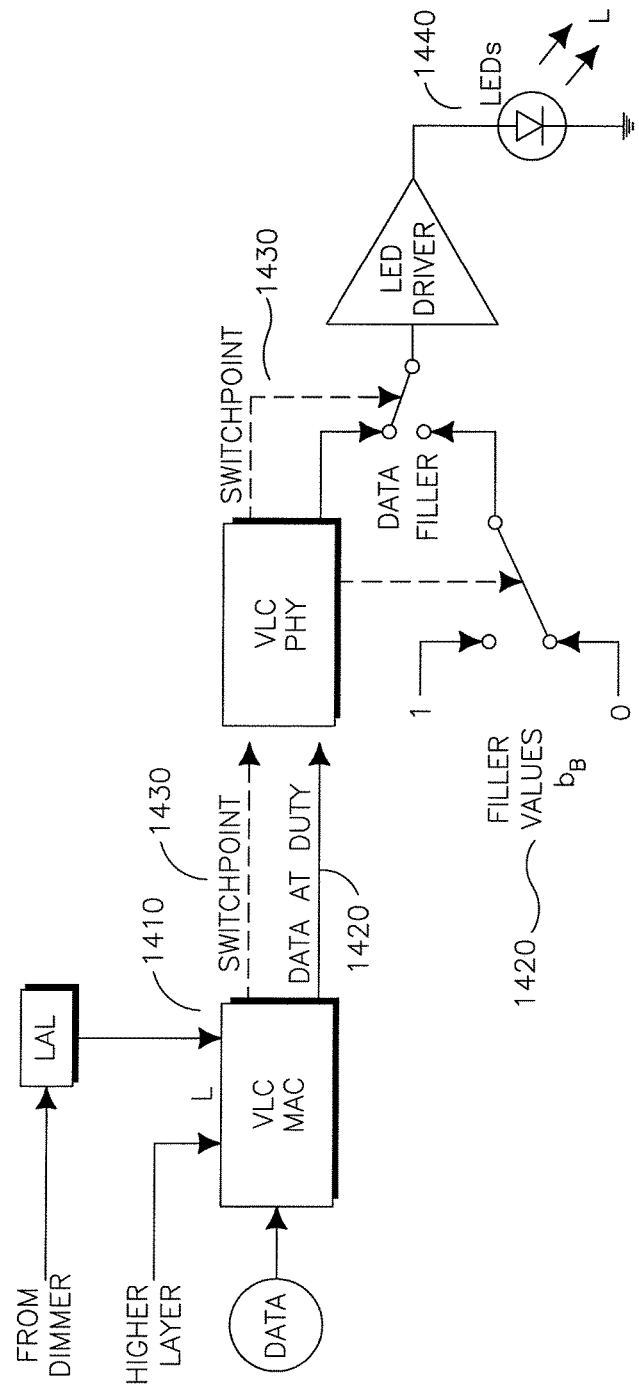
FIG. 14 is an example of VLC dimming controlled by MAC.

FIG. 14 is a block diagram showing dimming controlled by MAC 1400. The dimming signals are received from a higher level such as a light abstraction layer (LAL). The dimming signals are used to determine the duty cycle 1420. The MAC determines the switchpoint based on the duty cycle $\gamma_B$ 1430. The data is then output to the LED device 1440.

Figure 15:
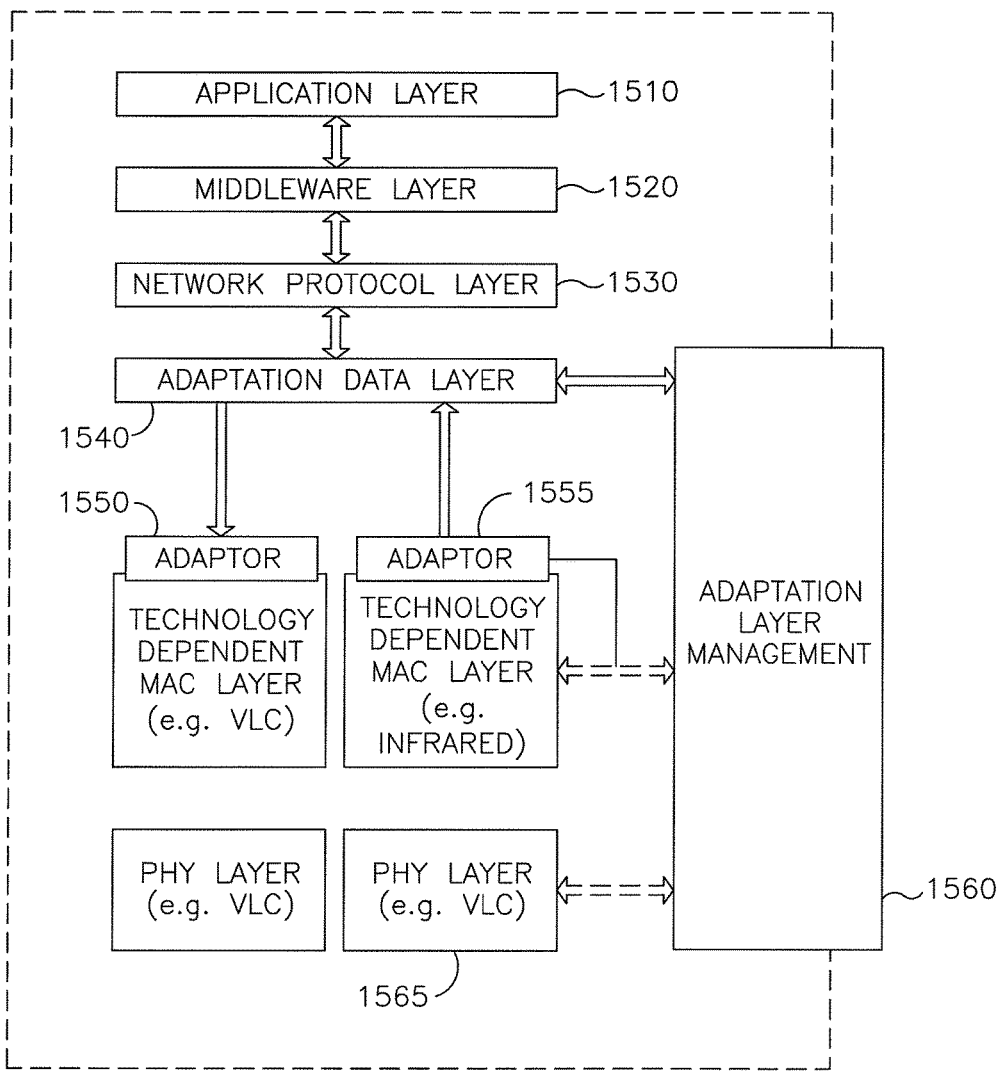
FIG. 15 is a block diagram showing VLC including adaptation layer support.

FIG. 15 is a block diagram showing VLC including adaptation layer support 1500. To perform infrastructure uplink on different radio access technologies (RAT), adaptation layer support is needed in the MAC. A management component 1560 features RAT availability, QoS mapping, control/data multiplexing options, and configurations. The management component 1560 transmits and receives information from the PHY layer 1565.

The architecture includes the following layers that may be used in both uplink and downlink transmissions: an application layer 1510, a middleware layer 1520, a network protocol layer 1530, an adaptation data layer 1540, a first adaptor coupled to a first technology dependent MAC layer 1550, a second adapter coupled to a second technology dependent MAC layer 1555. While two adaptors are described in this example, the number of adaptors may be limited by the number of RATs supported by the device.

One of the difficulties with VLC is that the availability of an uplink and downlink are independent due to device restrictions. In some environments, high intensity visible light based downlink may be easily be provided from infrastructure lighting fixtures, while uplink is limited to the transmit power of a portable device and may need to be provided using spectrum other than visible light (e.g., RF).

Another feature of visible light is that the optical confinement of LED light may provide localized high bandwidth density. This may be leveraged by allowing spectrum aggregation and using multiple access technologies in a single direction. Visible light may operate as a complementary communication link between two devices using, for example, visible light communications in the downlink and infrared in the uplink, or by creating hybrid topologies performing control and data communication over different access technologies, or by creating a "hotspot" functionality with multiple access technologies co-working in each direction.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, MTC device, terminal, base station, RNC, or any host computer.

What is claimed is:

1. A visible light communication (VLC) device for lighting and data transmission, the VLC device comprising:
    circuitry configured to receive a first stream of bits;
    the circuitry further configured to determine a first switchpoint for transmitting the first stream of bits and first filler data, wherein the first filler data is based on a brightness level;
    red, green, and blue (RGB) light emitting diodes (LEDs) configured to transmit the first stream of bits and the first filler data, wherein the first filler data begins to be transmitted at the first switchpoint;
    the circuitry configured to receive a second stream of bits, wherein the second stream of bits is different than the first stream of bits;
    the circuitry configured to determine a second switchpoint for transmitting the second stream of bits and second filler data, wherein the second filler data is based on the brightness level; and
    the RGB LEDs configured to transmit the second stream of bits and the second filler data, wherein the second filler data begins to be transmitted at the second switchpoint;
    wherein a naked eye of a human cannot detect flicker of the VLC device.

2. The VLC device of claim 1, wherein the circuitry is incorporated in a lamp.

3. The VLC device of claim 1, wherein the circuitry is incorporated in a traffic light.

4. The VLC device of claim 1, wherein bands of the RGB LEDs are multiplexed together and an overriding output color of the multiplexed RGB LEDs is white light.

5. The VLC device of claim 4, wherein a scrambling code is applied at each band of the bands of the RGB LEDs.

6. The VLC device of claim 1, wherein the circuitry is configured to band separate the first stream of bits prior to transmission by the RGB LEDs.

7. The VLC device of claim 1, wherein the circuitry is configured to band separate the second stream of bits prior to transmission by the RGB LEDs.

8. A method performed by a visible light communication (VLC) device for lighting and data transmission, the method comprising:
    receiving a first stream of bits;
    determining a first switchpoint for transmitting the first stream of bits and first filler data, wherein the first filler data is based on a brightness level;
    transmitting, by red green and blue (RGB) light emitting diodes (LEDs), the first stream of bits and the first filler data, wherein the first filler data begins to be transmitted at the first switchpoint;
    receiving a second stream of bits, wherein the second stream of bits is different than the first stream of bits;
    determining a second switchpoint for transmitting the second stream of bits and second filler data, wherein the second filler data is based on the brightness level; and
    transmitting, by the RGB LEDs, the second stream of bits and the second filler data, wherein the second filler data begins to be transmitted at the second switchpoint;
    wherein a naked eye of a human cannot detect flicker of the VLC device.

9. The method of claim 8, wherein the RGB LEDs are incorporated in a lamp.

10. The method of claim 8, wherein the RGB LEDs are incorporated in a traffic light.

11. The method of claim 8, wherein bands of the RGB LEDs are multiplexed together and an overriding output color of the multiplexed RGB LEDs is white light.

12. The method of claim 11, wherein a scrambling code is applied at each band of the bands of the RGB LEDs.

13. The method of claim 8, wherein the circuitry is configured to band separate the first stream of bits prior to transmission by the RGB LEDs.

14. The method of claim 8, wherein the circuitry is configured to band separate the second stream of bits prior to transmission by the RGB LEDs.

15. A visible light communication (VLC) device comprising:

circuitry configured to determine a first switchpoint for receiving a first stream of bits and first filler data, wherein the first filler data is based on a brightness level;

a receiver configured to receive, from red green and blue (RGB) light emitting diodes (LEDs), the first stream of bits and the first filler data, wherein the first filler data begins to be received at the first switchpoint;

the circuitry configured to determine a second switchpoint for receiving a second stream of bits and second filler data, wherein the second filler data is based on the brightness level; and the receiver configured to receive, from the RGB LEDs, the second stream of bits and the second filler data, wherein the second filler data begins to be received at the second switchpoint;

wherein a naked eye of a human cannot detect flicker of the RGB LEDs.

16. The VLC device of claim 15, wherein the RGB LEDs are incorporated in a lamp.

17. The VLC device of claim 15, wherein the RGB LEDs are incorporated in a traffic light.

18. The VLC device of claim 15, wherein bands of the RGB LEDs are multiplexed together and an overriding output color of the multiplexed RGB LEDs is white light.

19. The VLC device of claim 18, wherein each band of the bands of the RGB LEDs is scrambled.

* * * * *